(12) United States Patent
Fukunaga

(10) Patent No.: US 11,670,979 B2
(45) Date of Patent: Jun. 6, 2023

(54) STATOR

(71) Applicant: SUBARU CORPORATION, Tokyo (JP)

(72) Inventor: Kenichi Fukunaga, Tokyo (JP)

(73) Assignee: SUBARU CORPORATION, Tokyo (JP)

( * ) Notice: Subject to any disclaimer, the term of this patent is extended or adjusted under 35 U.S.C. 154(b) by 182 days.

(21) Appl. No.: 17/344,548

(22) Filed: Jun. 10, 2021

(65) Prior Publication Data

US 2021/0408856 A1 Dec. 30, 2021

(30) Foreign Application Priority Data

Jun. 24, 2020 (JP) ............................. JP2020-108876

(51) Int. Cl.
| | |
|---|---|
| *H02K 3/12* | (2006.01) |
| *H02K 1/16* | (2006.01) |
| *H02K 3/48* | (2006.01) |
| *H02K 3/28* | (2006.01) |

(52) U.S. Cl.
CPC ................ *H02K 3/12* (2013.01); *H02K 1/16* (2013.01); *H02K 3/28* (2013.01); *H02K 3/48* (2013.01); *H02K 2213/03* (2013.01)

(58) Field of Classification Search
CPC ...................................................... H02K 3/28
USPC ................................................. 310/187, 202
See application file for complete search history.

(56) References Cited

U.S. PATENT DOCUMENTS

| | | | | |
|---|---|---|---|---|
| 2004/0041491 | A1* | 3/2004 | Gorohata | H02K 3/12 310/187 |
| 2022/0085681 | A1* | 3/2022 | Kojima | H02K 3/522 |
| 2022/0140681 | A1* | 5/2022 | Uga | H02K 3/28 310/198 |

FOREIGN PATENT DOCUMENTS

| | | |
|---|---|---|
| JP | 2011-193600 A | 9/2011 |
| JP | 2014-036559 A | 2/2014 |
| JP | 2016-123247 A | 7/2016 |

* cited by examiner

*Primary Examiner* — Ahmed Elnakib
*Assistant Examiner* — Minki Chang
(74) *Attorney, Agent, or Firm* — McGinn I.P. Law Group, PLLC.

(57) ABSTRACT

A stator for a rotary electric machine includes a stator core and a stator winding. The stator core includes a core inner-peripheral portion including slots. The stator winding includes a phase winding including segment conductors. The phase winding includes parallel conductors connected in series. Each parallel conductor includes ones of the segment conductors connected in parallel. The segment conductors include weld end portions protruding from the slots, bent in circumferential directions of the stator core, and welded to one another to constitute conductor joint portions. The weld end portions include weld end portions which protrude from each of the slots and which include first and second weld end portions. The first and second weld end portions are bent in the circumferential directions. The second weld end portions are smaller in number than the first weld end portions.

8 Claims, 15 Drawing Sheets

[COMPARATIVE EXAMPLE]

STATOR

CROSS-REFERENCE TO RELATED APPLICATIONS

The present application claims priority from Japanese Patent Application No. 2020-108876 filed on Jun. 24, 2020, the entire contents of which are hereby incorporated by reference.

BACKGROUND

The disclosure relates to a stator of a rotary electric machine.

A stator of a rotary electric machine, such as an electric motor and a generator, includes a stator core having plural slots therein, and a stator coil wound on the stator core. As the stator coil wound on the stator core, there is proposed a stator coil including plural segment conductors formed substantially in a U shape (see Japanese Unexamined Patent Application Publication (JP-A) No. 2011-193600, JP-A No. 2016-123247, and JP-A No. 2014-36559).

SUMMARY

An aspect of the disclosure provides a stator for a rotary electric machine. The stator includes a stator core having a hollow cylindrical shape and a stator winding. The stator core includes a core inner-peripheral portion including slots. The stator winding includes a phase winding including segment conductors held in the slots. The phase winding includes parallel conductors connected to one another in series. Each of the parallel conductors includes ones of the segment conductors connected to one another in parallel. The segment conductors include weld end portions that protrude from the slots, that are bent in circumferential directions of the stator core, and that constitute conductor joint portions each of which includes one of the weld end portions welded to another of the weld end portions. The weld end portions include weld end portions which protrude from one of the slots among the weld end portions include first weld end portions and second weld end portions. The first weld end portions are bent in one of the circumferential directions of the stator core. The second weld end portions are bent in another of the circumferential directions of the stator core. The number of the second weld end portions is less than the number of the first weld end portions. The conductor joint portions include ones of conductor joint portions configured with the first weld end portions. The ones of the conductor joint portions include an outer conductor joint portion located on an outer side of the stator core in a radial direction of the stator core. The outer conductor joint portion is at least partly located on an outer side of the core inner-peripheral portion in the radial direction. A value obtained by dividing the number of segment conductors held in one of the slots among the segment conductors by the number of segment conductors that constitute one of the parallel conductors among the segment conductors is an odd number.

An aspect of the disclosure provides a stator for a rotary electric machine. The stator includes a stator core having a hollow cylindrical shape, and a stator winding. The stator core includes a core inner-peripheral portion including slots. The stator winding includes a phase winding including segment conductors held in the slots. The phase windings each includes parallel conductors connected to one another in series. Each of the parallel conductors each include plural ones of the segment conductors connected to one another in parallel. The segment conductors include weld end portions that protrude from the slots, and that are bent in circumferential directions of the stator core and that constitute conductor joint portions each of which includes one of the weld end portions welded to another of the weld end portions. The weld end portions include weld end portions which protrude from each of the slots include first weld end portions and second weld end portions. The first weld end portions are bent in one of the circumferential directions of the stator core. The second weld end portions are bent in another of the circumferential directions of the stator core. The number of the second weld end portions is less than the number of the first weld end portions. The conductor joint portions include ones of conductor joint portions configured with the first weld end portions. The ones of the conductor joint portions include an inner conductor joint portion located on an inner side of the stator core in a radial direction of the stator core. The outer conductor joint portion is at least partly located on an inner side of the core inner-peripheral portion in the radial direction. A value obtained by dividing the number of the segment conductors held in one of the slots among the segment conductors by the number of the segment conductors that constitute one of the parallel conductors among the segment conductors is an odd number.

BRIEF DESCRIPTION OF THE DRAWINGS

The accompanying drawings are included to provide a further understanding of the disclosure and are incorporated in and constitute a part of this specification. The drawings illustrate example embodiments and, together with the specification, serve to explain the principles of the disclosure.

DETAILED DESCRIPTION

Generally, concerning segment conductors that constitute a stator coil, the number of segment conductors that protrude from a slot and are bent in one of circumferential directions and the number of segment conductors that protrude from a slot and are bent in the other of the circumferential directions coincide with each other. However, making the number of segment conductors bent in one of the circumferential directions and the number of segment conductors bent in the other of the circumferential directions coincide with each other has been a cause of narrowing the scope for a designer of the stator coil.

It is desirable to widen the scope for a designer of a stator winding.

In the following, some embodiments of the disclosure are described in detail with reference to the accompanying drawings. Note that the following description is directed to illustrative examples of the disclosure and not to be construed as limiting to the disclosure. Factors including, without limitation, numerical values, shapes, materials, components, positions of the components, and how the components are coupled to each other are illustrative only and not to be construed as limiting to the disclosure. Further, elements in the following example embodiments which are not recited in a most-generic independent claim of the disclosure are optional and may be provided on an as-needed basis. The drawings are schematic and are not intended to be drawn to scale. Throughout the present specification and the drawings, elements having substantially the same function and configuration are denoted with the same numerals to avoid any redundant description.

In the following description, a three-phase alternating current synchronous motor-generator mounted on an electric vehicle, a hybrid vehicle, and other vehicles will be given as an example of a rotary electric machine 11 including a stator 10 according to the embodiment of the disclosure. However, this is not to be construed in a limiting sense. Any rotary electric machine may be applied insofar as the rotary electric machine includes the stator assembled with segment coils.

Configuration of Rotary Electric Machine

Figure 1:
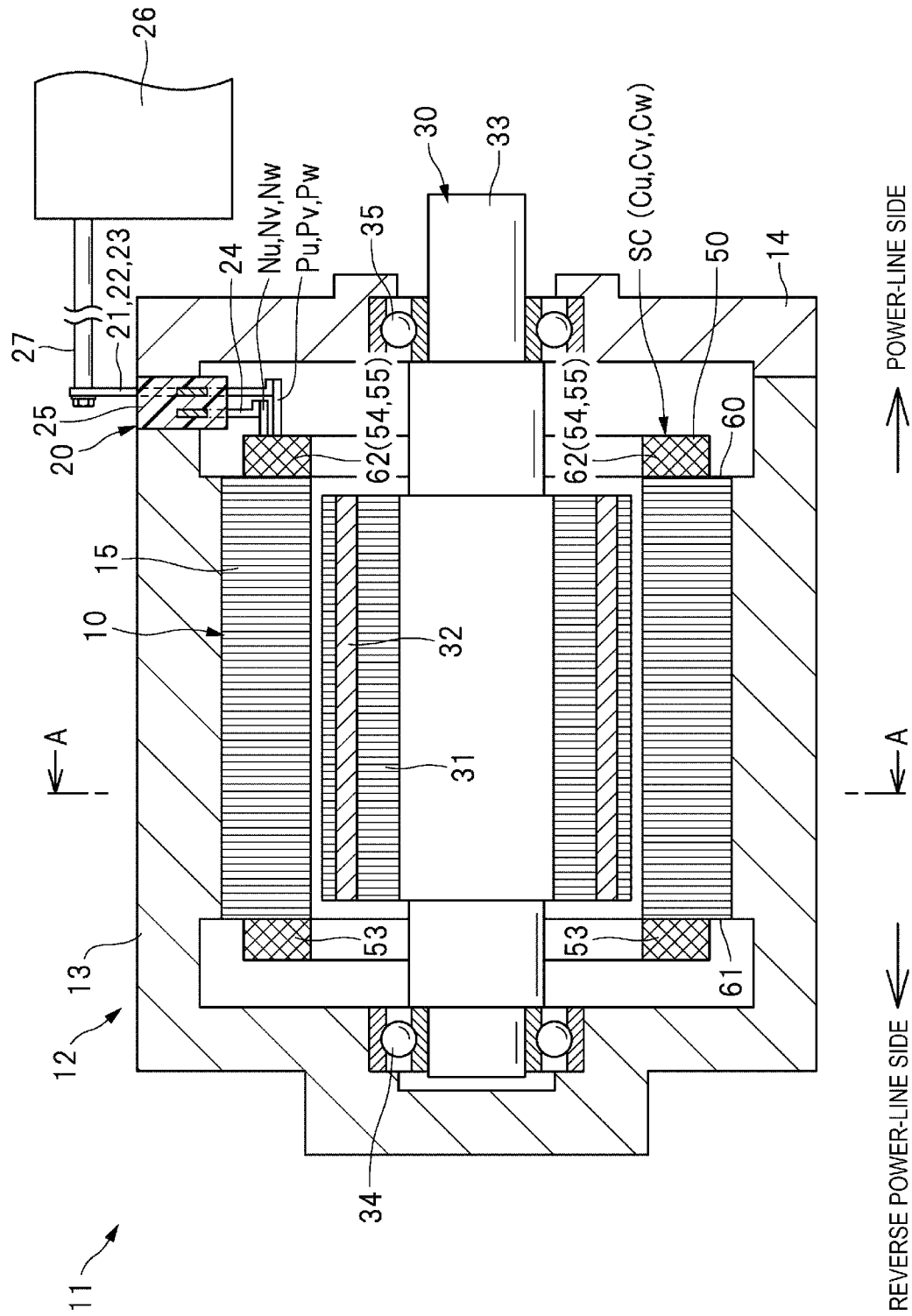
FIG. 1 is a cross-sectional view of an exemplary rotary electric machine including a stator according to an embodiment of the disclosure.

FIG. 1 is a cross-sectional view of an example of the rotary electric machine 11 including the stator 10 according to the embodiment of the disclosure. As illustrated in FIG. 1, the rotary electric machine 11 is a motor-generator and includes a motor housing 12. The motor housing 12 includes a housing body 13 of a bottomed, hollow cylindrical shape, and an end cover 14 that closes an open end of the housing body 13. The stator 10 is secured in the housing body 13 and includes a stator core 15 of a hollow cylindrical shape including plural silicon steel sheets, for example, and a three-phase stator coil SC wound on the stator core 15. In one example, the stator coil SC may serve as a "stator winding".

A bus bar unit 20 is coupled to the stator coil SC. This bus bar unit 20 includes three power bus bars 21 to 23 coupled to three power points Pu, Pv, and Pw of the stator coil SC, a neutral bus bar 24 that couples three neutral points Nu, Nv, and Nw of the stator coil SC to one another, and an insulating member 25 to hold these bus bars 21 to 24. End portions of the power bus bars 21 to 23 protrude outward from the motor housing 12, and a power cable 27 extending from an inverter 26, for example, is coupled to each of the power bus bars 21 to 23.

A rotor 30 of a solid cylindrical shape is rotatably accommodated in a center of the stator core 15. This rotor 30 includes a rotor core 31 of a hollow cylindrical shape including plural silicon steel sheets, for example, plural permanent magnets 32 buried in the rotor core 31, and a rotor shaft 33 secured in a center of the rotor core 31. One end of the rotor shaft 33 is supported by a bearing 34 disposed on the housing body 13, and the other end of the rotor shaft 33 is supported by a bearing 35 disposed on the end cover 14.

Configuration of Stator

Figure 2:
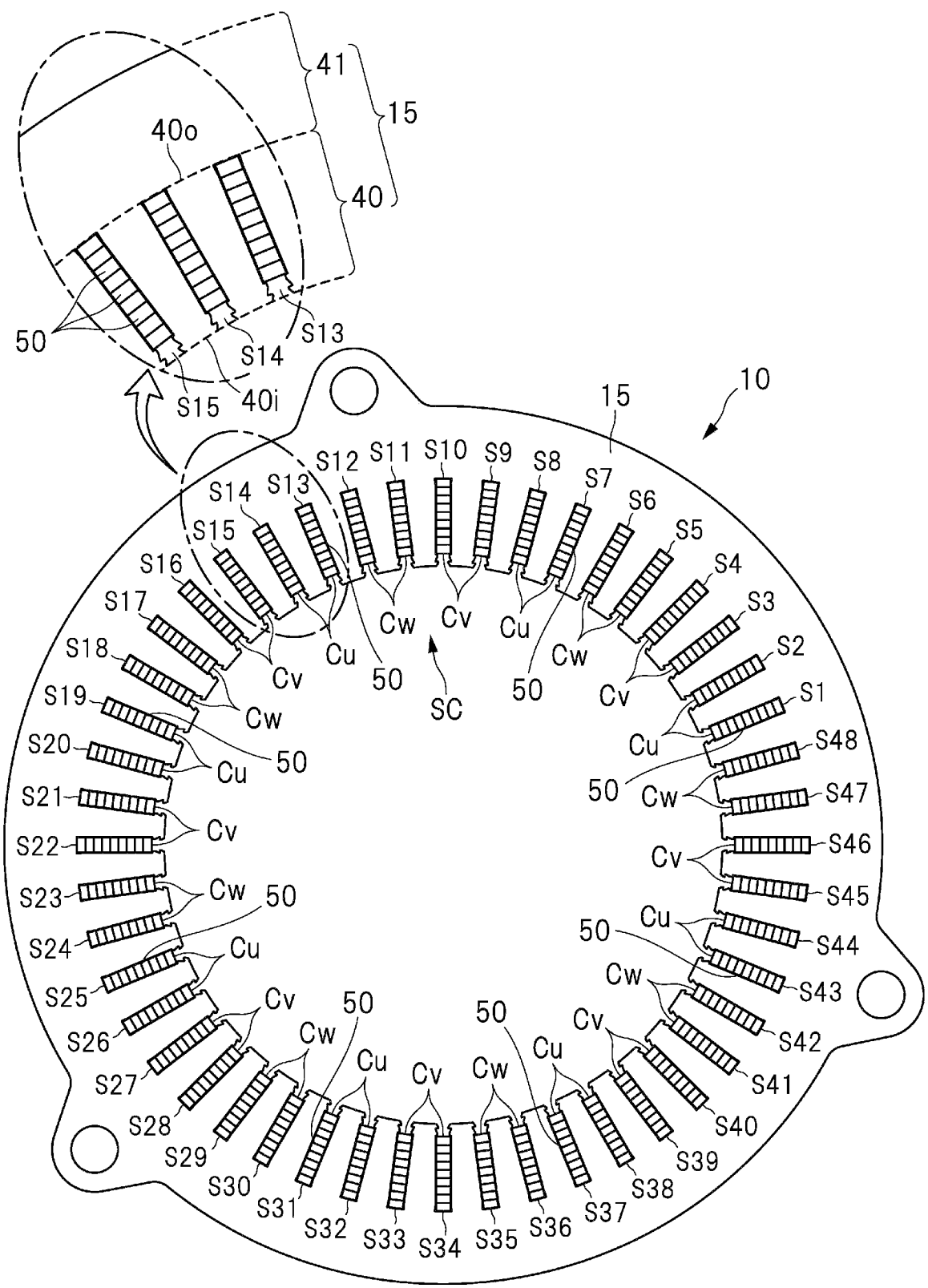
FIG. 2 is a cross-sectional view of the stator taken along line A-A in FIG. 1.
Figure 3:
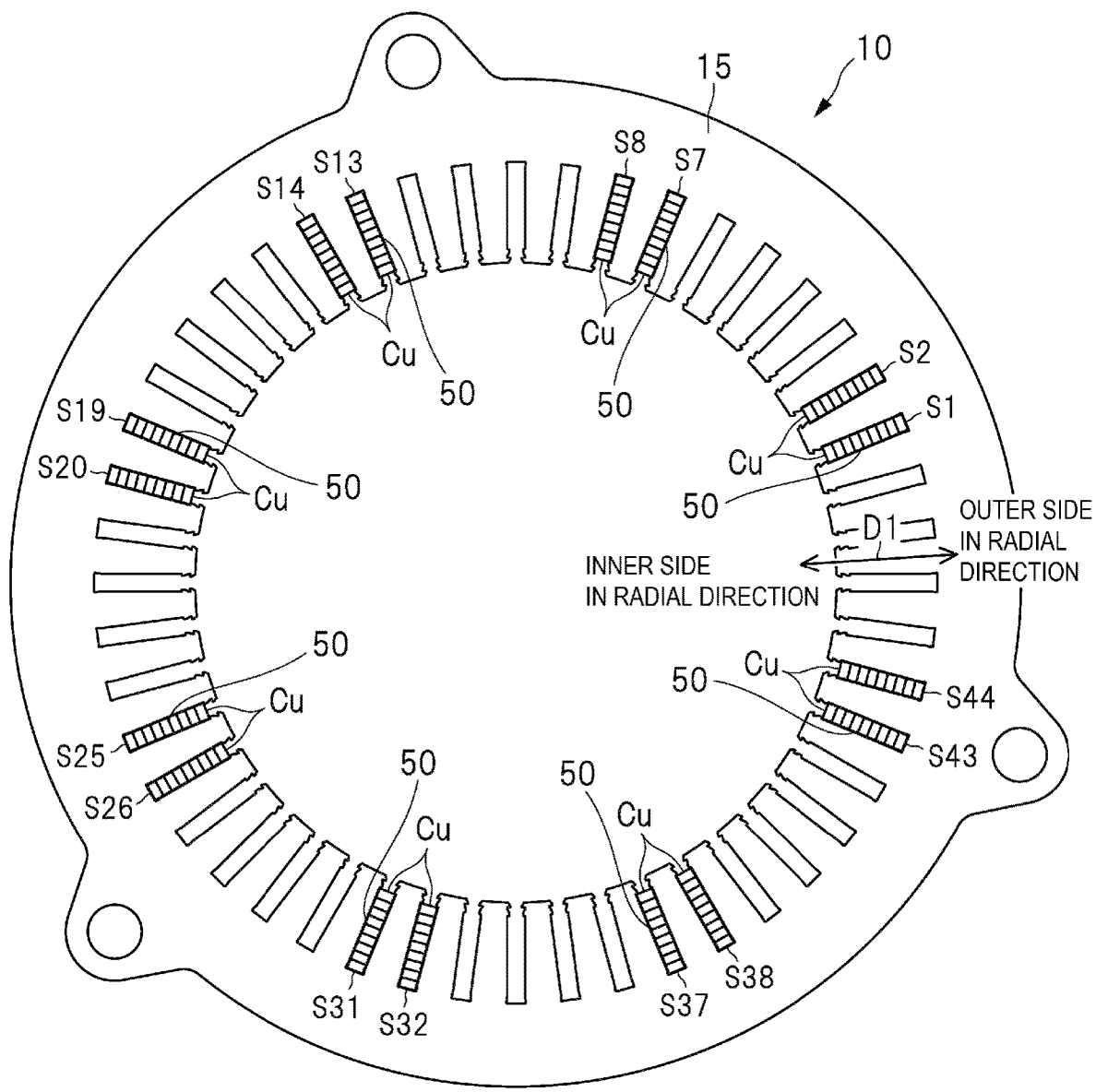
FIG. 3 is a cross-sectional view of a stator core including a U-phase coil.
Figure 4:
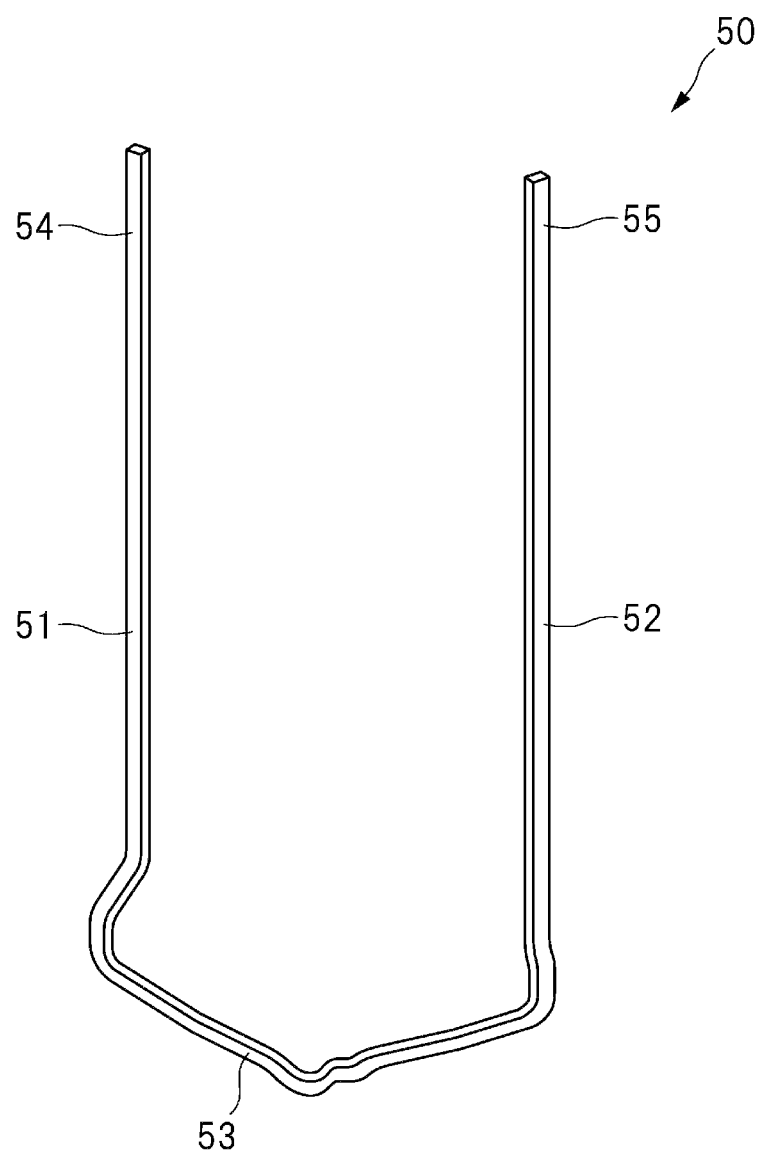
FIG. 4 is a perspective view of an exemplary segment coil.

FIG. 2 is a cross-sectional view of the stator 10 taken along line A-A in FIG. 1. FIG. 3 is a cross-sectional view of the stator core 15 including a phase winding of a U phase (hereinafter referred to as U-phase coil Cu). FIG. 4 is a perspective view of one of the segment coils 50 as an example. As described later, the stator coil SC includes a phase winding of a V phase (hereinafter referred to as V-phase coil Cv) and a phase winding of a W phase (hereinafter referred to as W-phase coil Cw) as well as the U-phase coil Cu. It is noted that the U-phase coil Cu, the V-phase coil Cv, and the W-phase coil Cw in the drawings have an identical coil configuration.

As illustrated in FIG. 2, the stator core 15 of the hollow cylindrical shape includes a core inner-peripheral portion 40 disposed on an inner side in a radial direction and a core outer-peripheral portion 41 disposed on an outer side in the radial direction. Plural slots S1 to S48 are formed in the core inner-peripheral portion 40 at predetermined intervals in a circumferential direction. In other words, the core inner-peripheral portion 40 of the stator core 15 is defined by an imaginary inner-peripheral surface 40i passing through an open end of each of the slots S1 to S48 and by an imaginary outer-peripheral surface 40o passing through a bottom surface of each of the slots S1 to S48. The plural segment coils 50 are inserted into each of the slots S1 to S48. The plural segment coils 50 are coupled to one another to constitute the stator coil SC. In one example, the segment coils 50 may serve as "segment conductors". As illustrated in FIGS. 2 and 3, the segment coils 50 that constitute the U-phase coil Cu are held in the slots S1, S2, S7, S8 . . . . As illustrated in FIG. 2, the segment coils 50 that constitute the V-phase coil Cv are held in the slots S3, S4, S9, S10 . . . , and the segment coils 50 that constitute the W-phase coil Cw are held in the slots S5, S6, S11, S12 . . . .

As illustrated in FIG. 4, each of the segment coils 50 bent substantially in the U shape includes a coil side 51 held in one of the slots (e.g., the slot S1), and a coil side 52 held in another slot (e.g., the slot S7) at a predetermined coil pitch. The segment coil 50 also includes an end portion 53 that couples the pair of coil sides 51 and 52 to each other, and weld end portions 54 and 55 that respectively extend from the pair of coil sides 51 and 52. It is noted that the segment coil 50 is made of a rectangular wire of a conductive material such as copper, and that the segment coil 50 except distal ends of the weld end portions 54 and 55 is coated with an insulating film of enamel, resin or the like. The end portion 53 of the segment coil 50 is not limited to a bent shape illustrated in FIG. 4 but has various bent shapes in accordance with an assembling position with respect to the stator core 15.

Figure 5:
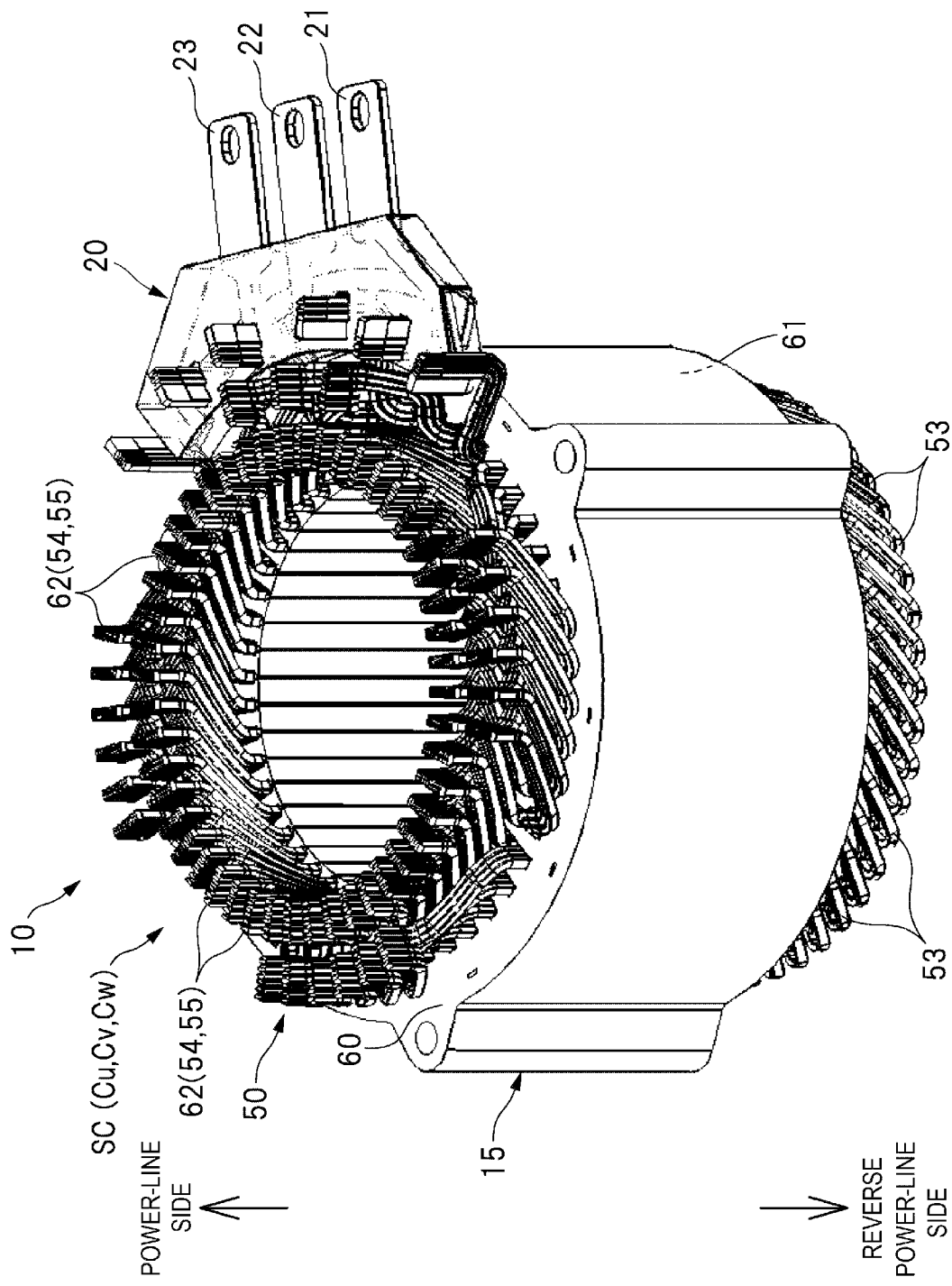
FIG. 5 is a perspective view of the stator as viewed from a power-line side.
Figure 6B:
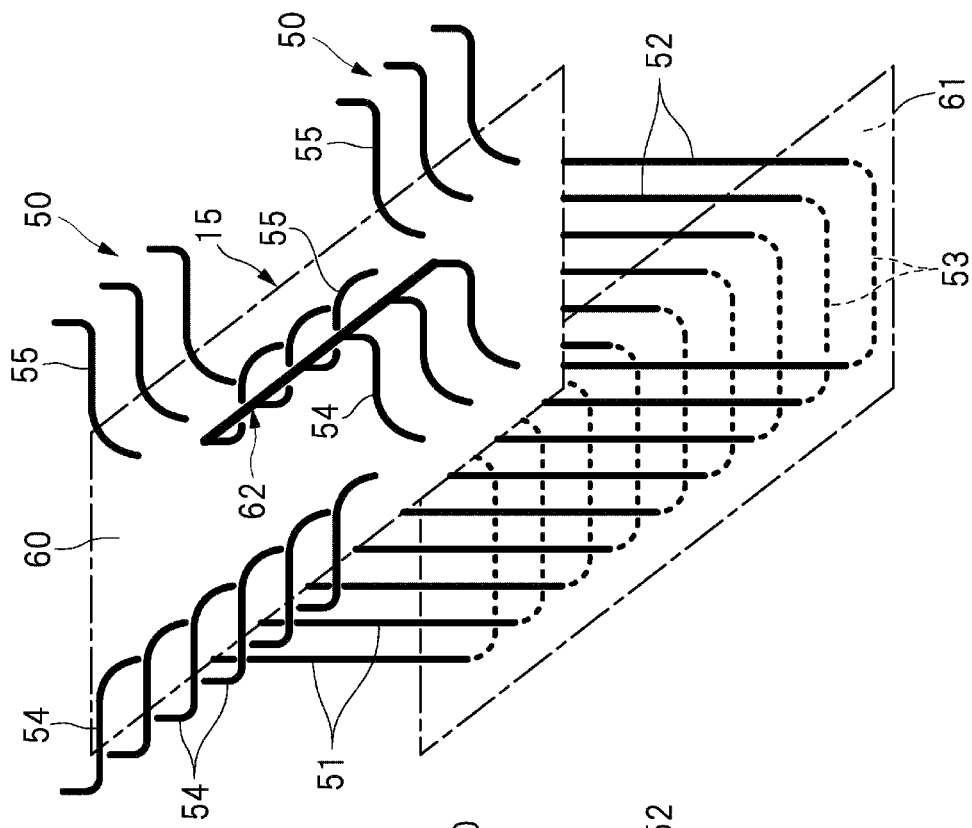
FIGS. 6A and 6B are diagrams illustrating an example of a coupling state of the segment coils.
Figure 6A:
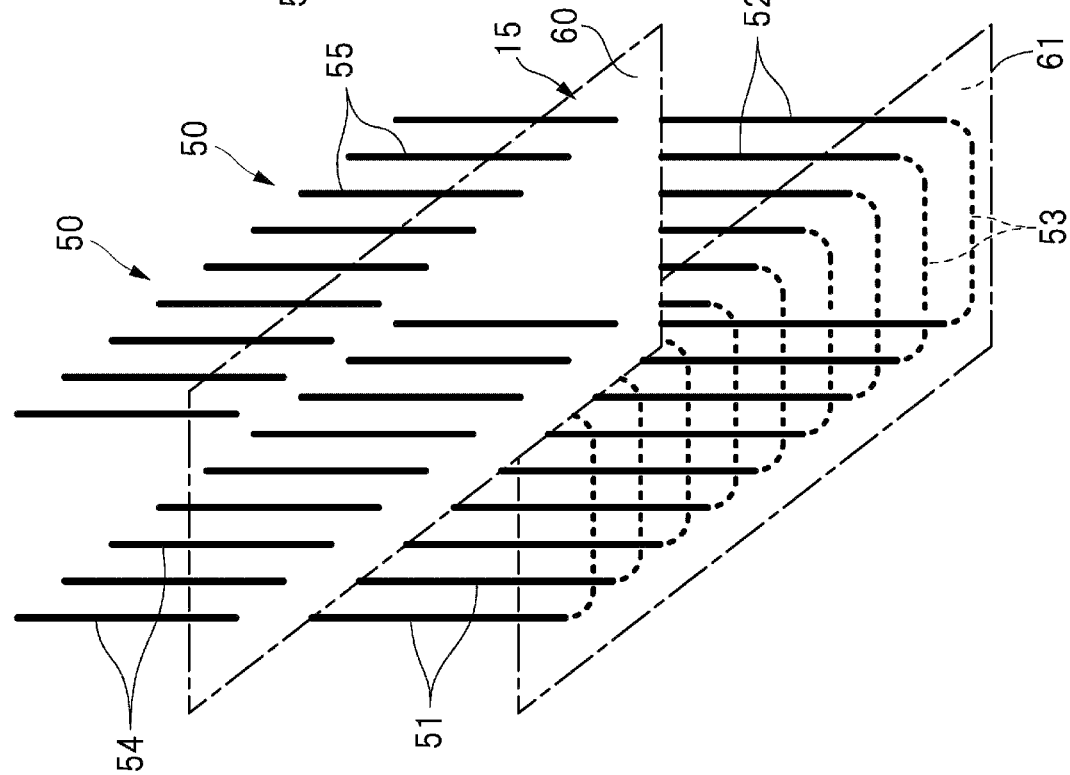

FIG. 5 is a perspective view of the stator 10 as viewed from a power-line side. It is noted that the power-line side is a side where the bus bar unit 20 is disposed. FIGS. 6A and 6B are diagrams illustrating an example of a coupling state of the segment coils 50. As described above, the plural segment coils 50 are assembled with the stator core 15.

When the segment coils 50 are assembled with the stator core 15 in the above-described manner, the weld end portions 54 and 55 of the segment coils 50 protrude from one end surface 60 of the stator core 15 to the power-line side, and the end portions 53 of the segment coils 50 protrude from the other end surface 61 of the stator core 15 to a reverse power-line side as illustrated in FIGS. 5, 6A, and 6B.

As illustrated in FIG. 6B, the weld end portions 54 and 55 that protrude from the one end surface 60 of the stator core 15 are bent into contact with the weld end portions 54 and 55 of other segment coils 50 and thereafter welded to the weld end portions 54 and 55 of the other segment coils 50 in contact. Thus, the weld end portions 54 and 55 of the segment coils 50 are welded to one another to form conductor joint portions 62, and the plural segment coils 50 are electrically coupled to one another into a single conductor. In this manner, the plural segment coils 50 constitute the U-phase coil Cu, the plural segment coils 50 constitute the V-phase coil Cv, and the plural segment coils 50 constitute the W-phase coil Cw. It is noted that the conductor joint portions 62 that have undergone welding such as TIG welding are subjected to insulating processing to form a resin film, for example, to coat the conductor.

Configuration of Stator Coil

Figure 7:
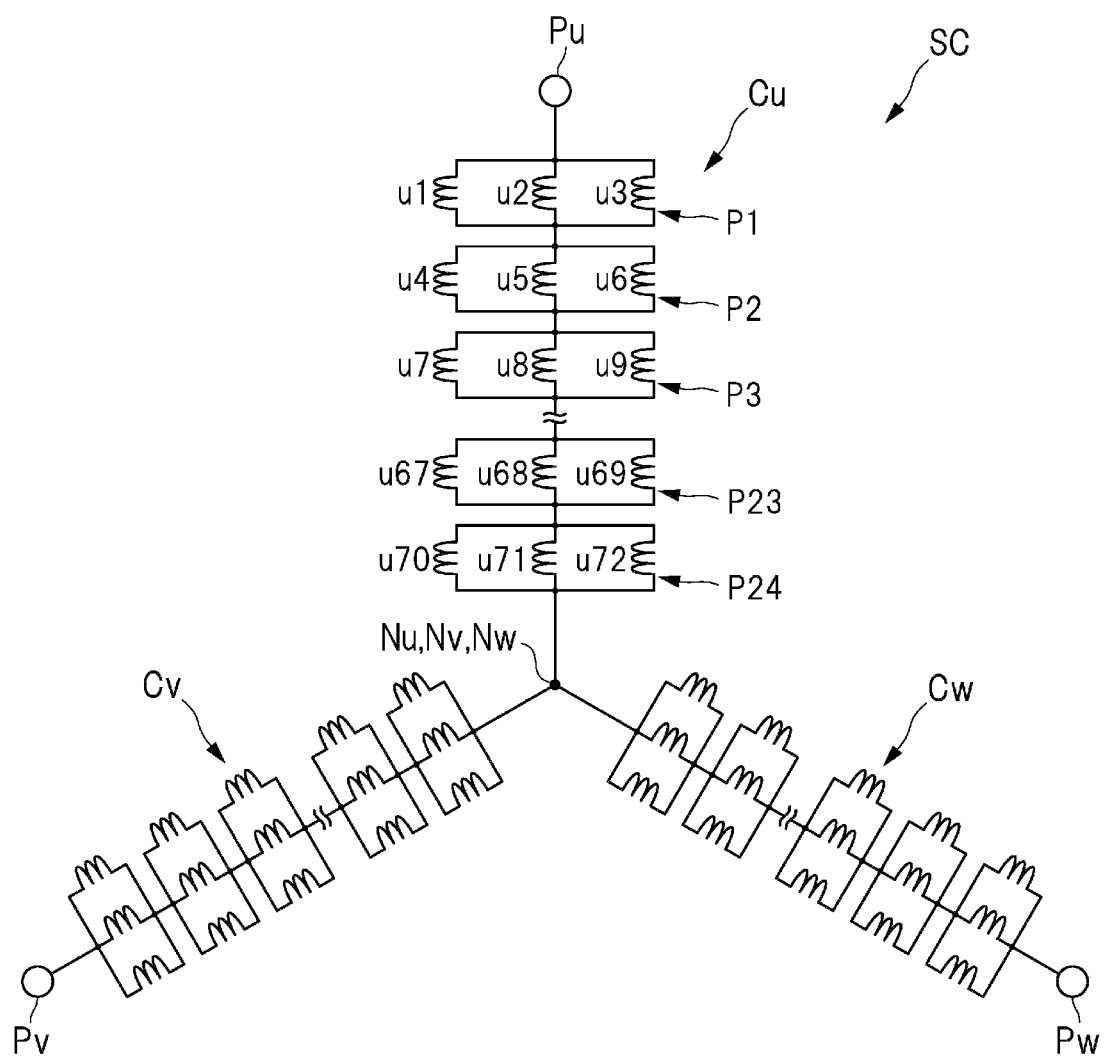
FIG. 7 is a diagram illustrating an example of a coupling state of a stator coil.

FIG. 7 is a diagram illustrating an example of a coupling state of the stator coil SC. It is noted that although the segment coils are denoted by a reference symbol "50" in the preceding description, the segment coils that constitute the U-phase coil Cu will be denoted by reference symbols "u1 to u72" in the following description in order to discriminate the individual segment coils. The U-phase coil Cu will now be mainly described. As described above, each of the phase coils Cu, Cv, and Cw has the identical coil configuration.

As illustrated in FIG. 7, the U-phase coil Cu, the V-phase coil Cv, and the W-phase coil Cw constitute the stator coil SC. The U-phase coil Cu includes plural parallel coils P1 to P24 coupled to one another in series. In one example, the parallel coils P1 to P24 may serve as "parallel conductors". Each of the parallel coils P1 to P24 includes three segment coils u1 to u3, u4 to u6 . . . coupled to one another in parallel. In one example, the segment coils u1 to u3, u4 to u6 . . . may serve as "segment conductors". For example, the parallel coil P1 includes three segment coils u1 to u3, the parallel coil P2 includes three segment coils u4 to u6, and the parallel coil P3 includes three segment coils u7 to u9. The parallel coil P23 includes three segment coils u67 to u69, and the parallel coil P24 includes three segment coils u70 to u72. One end of the U-phase coil Cu of this configuration serves as a power point Pu, and the other end of the U-phase coil Cu serves as a neutral point Nu.

Similarly, the V-phase coil Cv includes plural parallel coils coupled to one another in series. One end of the V-phase coil Cv of this configuration serves as a power point Pv, and the other end of the V-phase coil Cv serves as a neutral point Nv. The W-phase coil Cw includes plural parallel coils coupled to one another in series. One end of the W-phase coil Cw of this configuration serves as a power point Pw, and the other end of the W-phase coil Cw serves as a neutral point Nw. The neutral point Nu of the U-phase coil Cu, the neutral point Nv of the V-phase coil Cv, and the neutral point Nw of the W-phase coil Cw are coupled to one another. These phase coils Cu, Cv, and Cw constitute the stator coil SC.

Configuration of U-phase Coil

Figure 8:
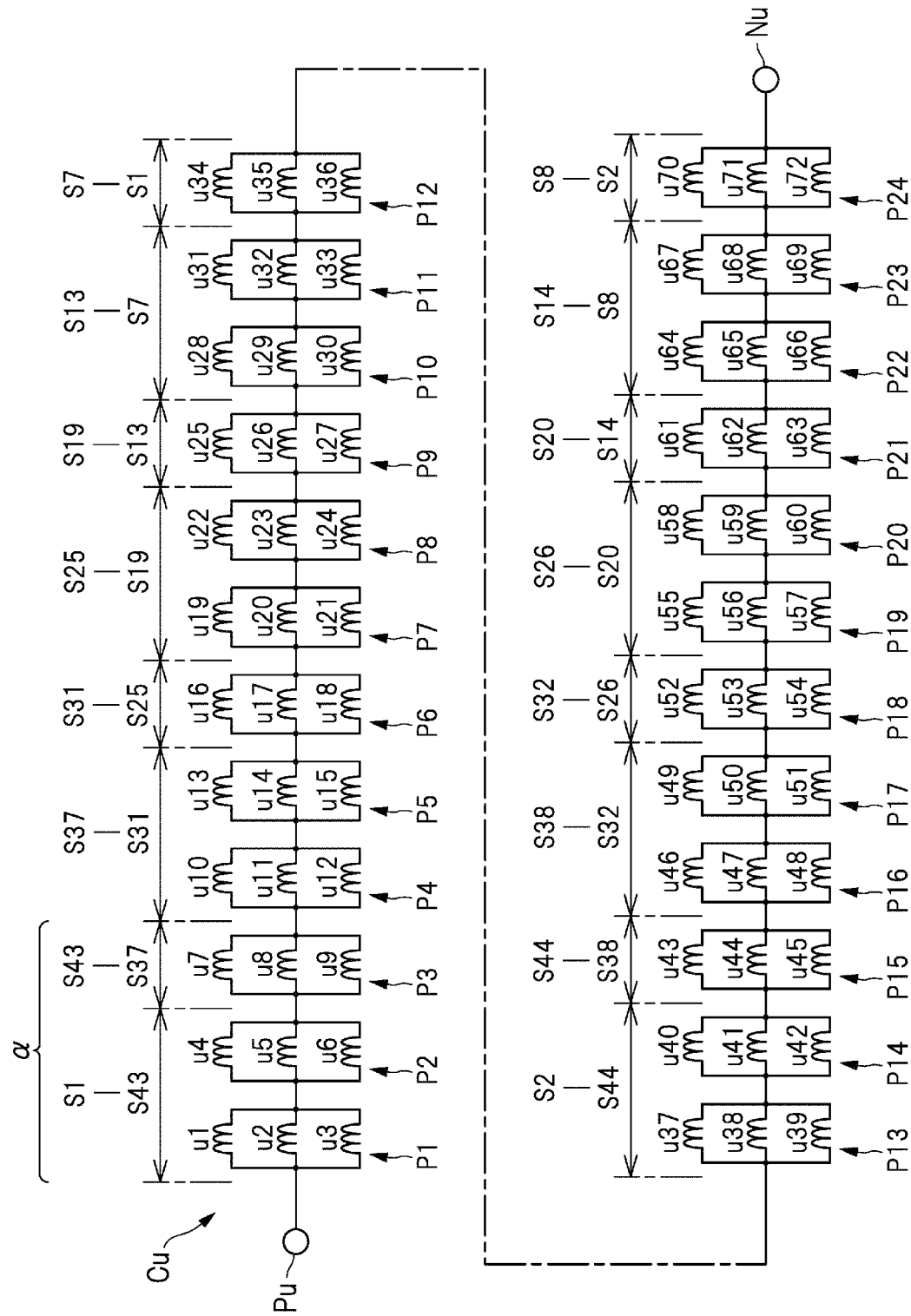
FIG. 8 is a diagram illustrating an exemplary coil configuration of the U-phase coil.
Figure 9:
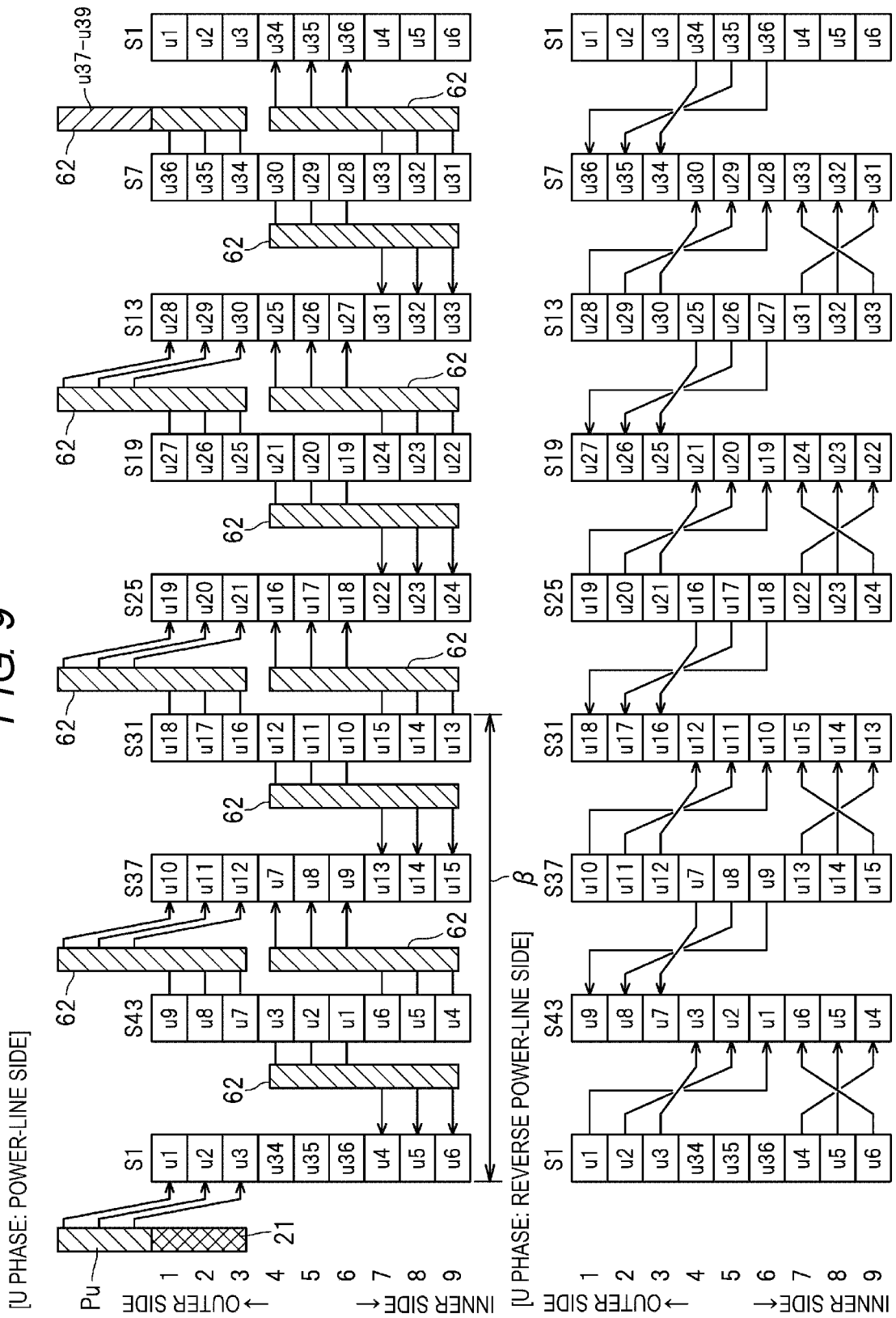
FIG. 9 is a diagram illustrating holding positions of the segment coils that constitute the U-phase coil with respect to slots.
Figure 10:
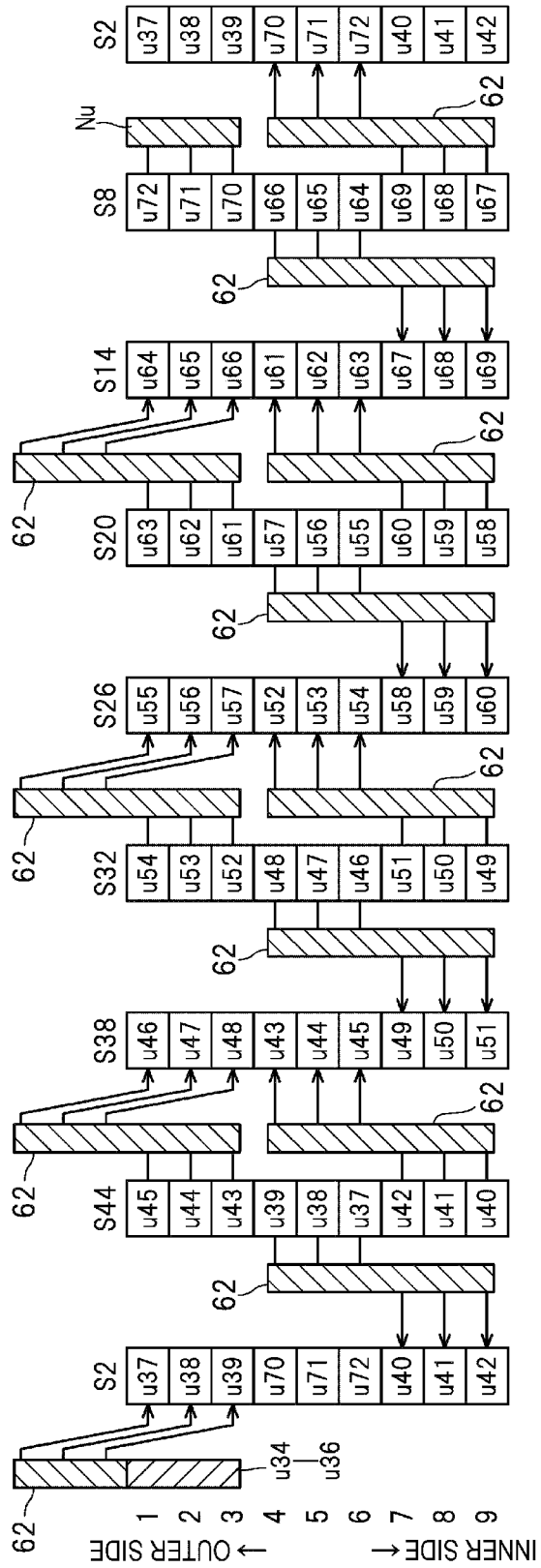
FIG. 10 is a diagram illustrating holding positions of the segment coils that constitute the U-phase coil with respect to the slots.

FIG. 8 is a diagram illustrating an exemplary coil configuration of the U-phase coil Cu. Each pair of slot numbers in FIG. 8 indicate two slots where each group of the segment coils u1 to u72 extends and is held. FIGS. 9 and 10 are diagrams illustrating holding positions of the segment coils u1 to u72 that constitute the U-phase coil Cu with respect to the slots S1, S2, S7, S8 . . . . FIG. 9 illustrates holding positions of the segment coils u1 to u36, and FIG. 10 illustrates holding positions of the segment coils u37 to u72.

The "power-line side" illustrated in FIGS. 9 and 10 refers to a side where the weld end portions 54 and 55 of the segment coils 50 are located as illustrated in FIGS. 1 and 5. The "reverse power-line side" illustrated in FIGS. 9 and 10 refers to a side opposite to the power-line side, that is, a side where the end portions 53 of the segment coils 50 are located as illustrated in FIGS. 1 and 5. As illustrated in FIG. 3, an "inner side" illustrated in FIGS. 9 and 10 refers to an inner side of the stator core 15 in the radial direction, and an "outer side" illustrated in FIGS. 9 and 10 refers to an outer side of the stator core in the radial direction. It is noted that hatched portions in FIGS. 9 and 10 indicate the conductor joint portions 62 where the weld end portions of the segment coils u1 to u72 are welded to each other. Directions of arrows in FIGS. 9 and 10 refer to directions from the power point Pu to the neutral point Nu.

As illustrated in FIG. 8, the U-phase coil Cu has a coil configuration where a connection pattern of three parallel coils (e.g., P1 to P3, P4 to P6, . . . ) is repeated, that is, a coil configuration where a connection pattern of nine segment coils (e.g., u1 to u9, u10 to u18, . . . ) is repeated. A connection pattern of the segment coils u1 to u9 as one unit of connection pattern will now be described as indicated by reference symbol a in FIG. 8.

As illustrated in FIG. 9, nine segment coils are held in each slot. Firstly, the segment coil u1 extends over and is held in a first position (an outer position) of the slot S1 and a sixth position of the slot S43. The segment coil u2 extends over and is held in a second position of the slot S1 and a fifth position of the slot S43. The segment coil u3 extends over and is held in a third position of the slot S1 and a fourth position of the slot S43. The segment coil u4 extends over and is held in a seventh position of the slot S1 and a ninth position of the slot S43. The segment coil u5 extends over and is held in an eighth position of the slot S1 and an eighth position of the slot S43. The segment coil u6 extends over and is held in a ninth position of the slot S1 and a seventh position of the slot S43. The segment coil u7 extends over and is held in a third position of the slot S43 and a fourth position of the slot S37. The segment coil u8 extends over and is held in a second position of the slot S43 and a fifth position of the slot S37. The segment coil u9 extends over and is held in a first position of the slot S43 and a sixth position of the slot S37.

Between the slots S1 and S43 on the power-line side, the segment coils u1 to u3 that extend from the slot S43 and the segment coils u4 to u6 that extend from the slot S1 are welded to each other via the conductor joint portion 62. Between the slots S43 and S37, the segment coils u4 to u6 that extend from the slot S43 and the segment coils u7 to u9 that extend from the slot S37 are welded to each other via the conductor joint portion 62. The segment coils u10 to u12 that constitute a next connection pattern are welded to the segment coils u7 to u9 that extend from the slot S43, via the conductor joint portion 62. It is noted that the segment coils u1 to u3 that extend from the slot S1 are welded to the power bus bar 21 as the power point Pu. Such a connection pattern is repeated to connect the segment coils u1 to u72. Thus, as illustrated in FIGS. 8 to 10, the segment coils u1 to u72 constitute the U-phase coil Cu.

Conductor Joint Portions of Stator Coil SC

Figure 11:
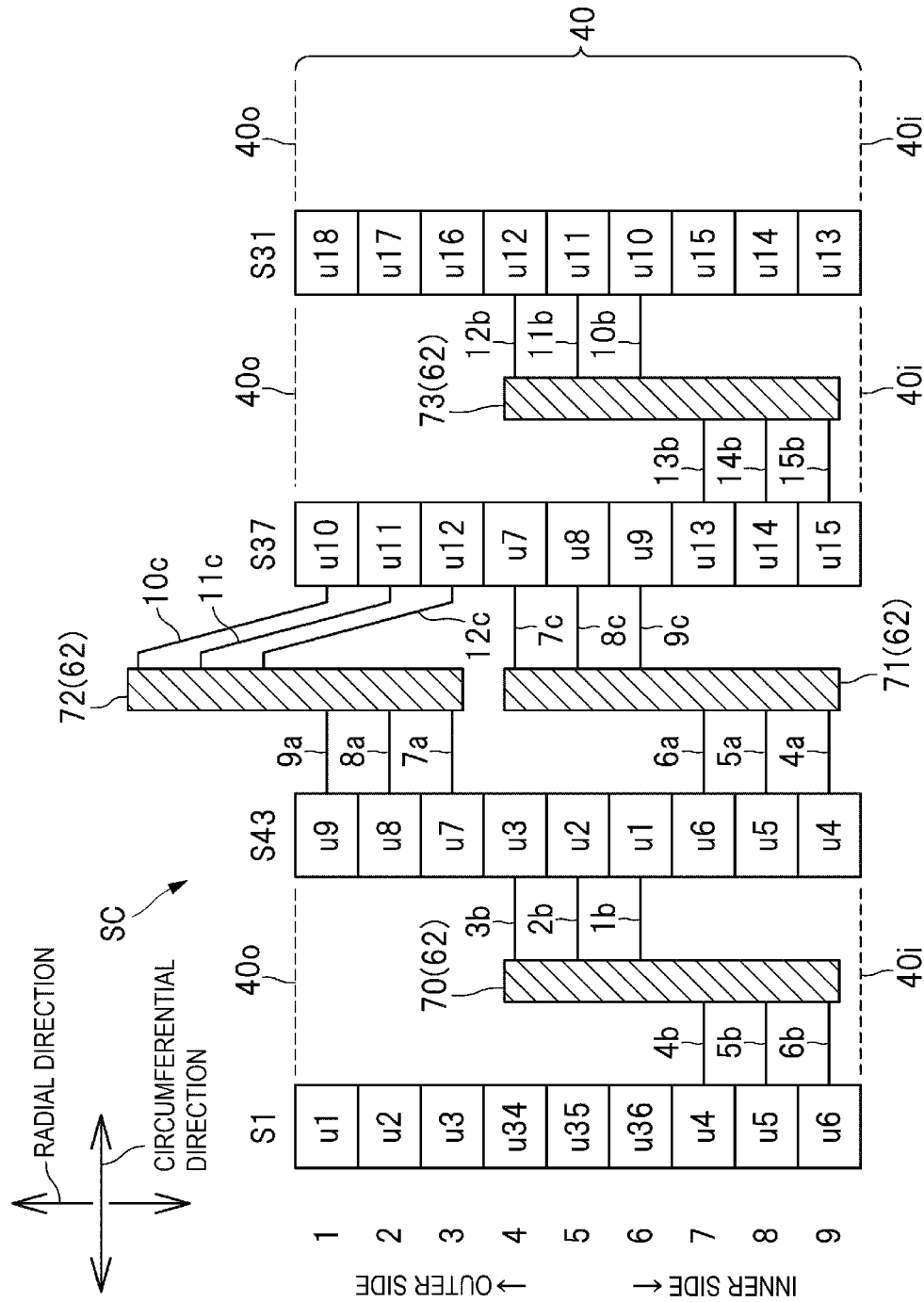
FIG. 11 is an enlarged view of a range β in FIG. 9.
Figure 12:
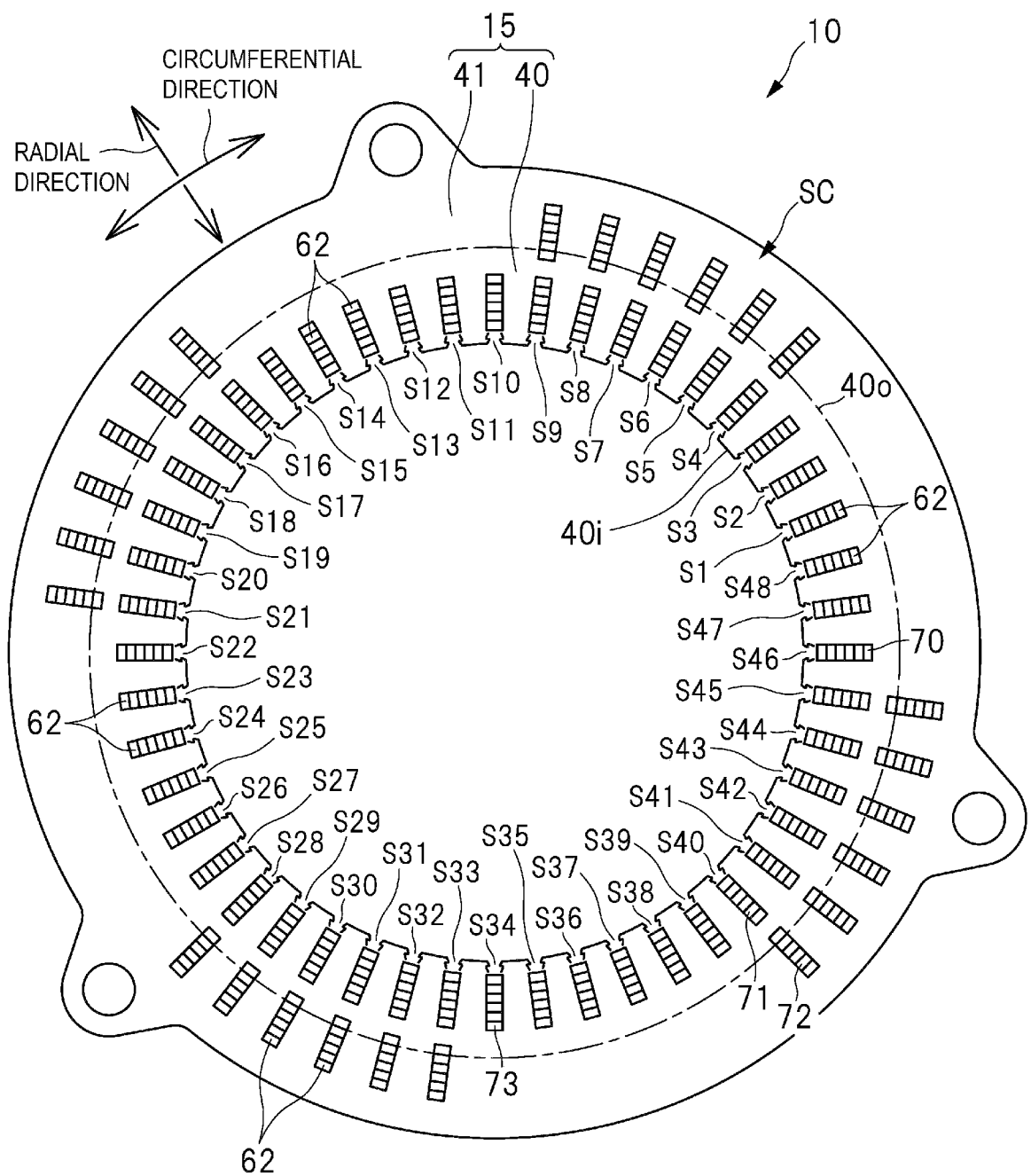
FIG. 12 is a diagram illustrating conductor joint portions of the stator coil as viewed from the power-line side.

As described above, each of the parallel coils P1 to P24 that constitute the U-phase coil Cu includes the three segment coils u1 to u3, u4 to u6 . . . coupled to one another in parallel. That is, the weld end portions 54 and 55 of six segment coils 50 constitute each of the conductor joint portions 62 of the stator coil SC. FIG. 11 is an enlarged view of a range β in FIG. 9. FIG. 12 is a diagram illustrating the conductor joint portions 62 of the stator coil SC as viewed from the power-line side. In the following description, to discriminate the individual conductor joint portions and the individual weld end portions, the conductor joint portions will be denoted by reference symbols other than "62", and the weld end portions will be denoted by reference symbols other than "54 and 55".

As illustrated in FIG. 11, between the slots S1 and S43, weld end portions 4b to 6b of the segment coils u4 to u6 are bent in a circumferential direction from the slot S1 to the slot S43, and weld end portions 1b to 3b of the segment coils u1 to u3 are bent in a circumferential direction from the slot S43 to the slot S1. The weld end portions 4b to 6b and the weld end portions 1b to 3b abut against and are welded to each other to form a conductor joint portion 70 including the six weld end portions 1b to 6b.

Between the slots S43 and S37, weld end portions 4a to 6a of the segment coils u4 to u6 are bent in the circumferential direction from the slot S43 to the slot S37, and weld end portions 7c to 9c of the segment coils u7 to u9 are bent in the circumferential direction from the slot S37 to the slot S43. The weld end portions 4a to 6a and the weld end portions 7c to 9c abut against and are welded to each other to form a conductor joint portion 71 including the six weld end portions 4a to 6a and 7c to 9c.

Moreover, between the slots S43 and S37, weld end portions 7a to 9a of the segment coils u7 to u9 are bent in the circumferential direction from the slot S43 to the slot S37, and weld end portions 10c to 12c of the segment coils u10 to u12 are bent both in the circumferential direction and in a radially outward direction from the slot S37 to the slot S43. The weld end portions 7a to 9a and the weld end portions 10c to 12c abut against and are welded to each other to form a conductor joint portion 72 including the six weld end portions 7a to 9a and 10c to 12c.

Between the slots S37 and S31, weld end portions 13b to 15b of the segment coils u13 to u15 are bent in the circumferential direction from the slot S37 to the slot S31, and weld end portions 10b to 12b of the segment coils u10 to u12 are bent in the circumferential direction from the slot S31 to the slot S37. The weld end portions 13b to 15b and the weld end portions 10b to 12b abut against and are welded to each other to form a conductor joint portion 73 including the six weld end portions 10b to 15b.

As illustrated in FIG. 11, the single conductor joint portion 70 is interposed between the slots S1 and S43, the two conductor joint portions 71 and 72 overlapping each other in the radial direction are interposed between the slots S43 and S37, and the single conductor joint portion is interposed between the slots S37 and S31. As illustrated in FIG. 12, the whole stator coil SC includes many other conductor joint portions 62. It is noted that the conductor joint portion 70 is disposed in the vicinity of the slot S46, that the conductor joint portions 71 and 72 are disposed in the vicinity of the slot S40, and that the conductor joint portion 73 is disposed in the vicinity of the slot S34.

As illustrated in FIGS. 11 and 12, of the two conductor joint portions 71 and 72 overlapping each other in the radial direction, the conductor joint portion 72 located on an outer side of the stator core 15 in the radial direction is at least partly located on an outer side of the core inner-peripheral portion 40, namely, the imaginary outer-peripheral surface 40o in the radial direction. In one example, the conductor joint portion 72 may serve as an "outer conductor joint portion". In this manner, because at least part of the conductor joint portion 72 is located on an outer side of the core inner-peripheral portion 40 in the radial direction, the conductor joint portion 72 can be disposed apart from the conductor joint portion 71 in the radial direction. With this configuration, even when nine segment coils are held in each slot, each of the parallel coils can be configured with three segment coils.

Take the slot S43 for example. The plural weld end portions protruding from the slot S43 include the plural weld end portions 4a to 9a bent in one of the circumferential directions of the stator core 15, and the plural weld end portions 1b to 3b bent in the other of the circumferential directions of the stator core 15. The number of the weld end portions 1b to 3b is less than the number of the weld end portions 4a to 9a. In one example, the weld end portions 4a to 9a may serve as "first weld end portions", and the weld end portions 1b to 3b may serve as "second weld end portions". Of the plural conductor joint portions 71 and 72 configured with the weld end portions 4a to 9a, the conductor joint portion 72 located on an outer side of the stator core 15 is at least partly located on an outer side of the core inner-peripheral portion 40 in the radial direction.

Take the slot S37 for example. The plural weld end portions protruding from the slot S37 include the plural weld end portions 7c to 12c bent in one of the circumferential directions of the stator core 15, and the plural weld end portions 13b to 15b bent in the other of the circumferential directions of the stator core 15. The number of the weld end portions 13b to 15b is less than the number of the weld end portions 7c to 12c. In one example, the weld end portions 7c to 12c may serve as "first weld end portions", and the weld end portions 13b to 15b may serve as "second weld end portions". Of the plural conductor joint portions 71 and 72 configured with the weld end portions 7c to 12c, the conductor joint portion 72 located on an outer side of the stator core 15 is at least partly located on an outer side of the core inner-peripheral portion 40 in the radial direction.

As illustrated in FIG. 11, the conductor joint portion 72 is configured with the plural weld end portions 7a to 9a and 10c to 12c that protrude from the pair of slots S43 and S37 of the plural slots. The weld end portions 7a to 9a that protrude from one of the pair of slots, namely, the slot S43 are bent in the circumferential direction of the stator core 15, and the weld end portions 10c to 12c that protrude from the other of the pair of slots, namely, the slot S37 are bent both in the circumferential direction and in the radially outward direction of the stator core 15.

As described above, the conductor joint portion 72 is at least partly located on an outer side of the core inner-peripheral portion 40 in the radial direction so that even when nine segment coils are held in each slot, each of the parallel coils can be configured with three segment coils. That is, a value obtained by dividing the number (nine in the illustrated example) of the segment coils held in each of the slots S1 to S48 by the number (three in the illustrated example) of the segment coils that constitute each of the parallel coils P1 to P24 can be set at a value of an odd number ("3" in the illustrated example). In this manner, the value obtained by dividing the number of the coils held in each of the slots by the number of the coils in each of the parallel coils, that is, the number of turns formed by each parallel coil can be set at a value of an odd number so as to widen the scope for a designer of the stator coil SC.

Comparative Example

Figure 13:
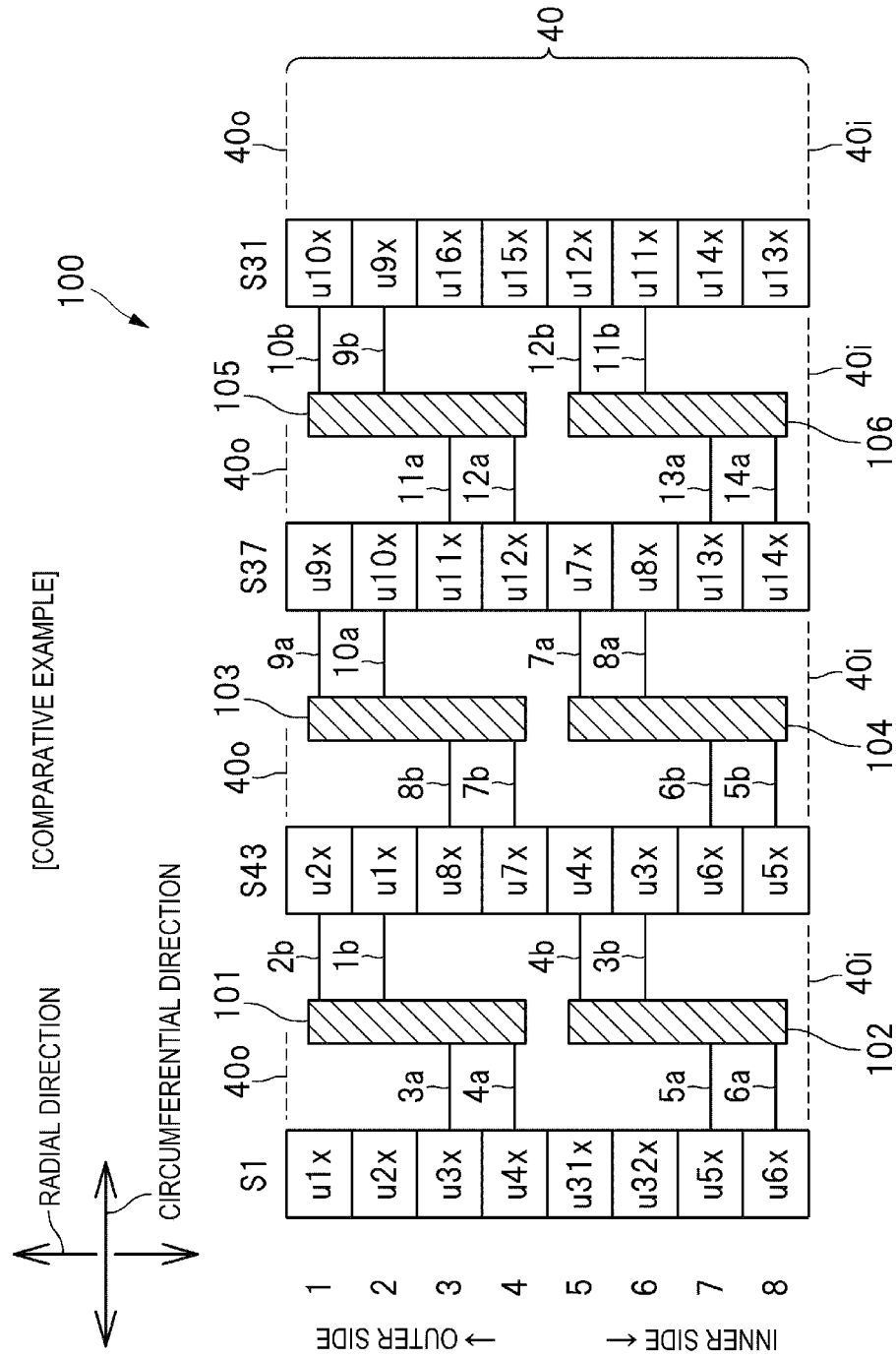
FIG. 13 is a diagram illustrating part of a coupling state of a stator coil as a comparative example.

FIG. 13 is a diagram illustrating part of a coupling state of a stator coil 100 as a comparative example. It is noted that FIG. 13 illustrates a range similar to the range illustrated in FIG. 11. It is also noted that the stator coil 100 illustrated in FIG. 13 includes plural parallel coils coupled to one another in series. Each of the parallel coils includes two segment coils connected to each other in parallel. For example, segment coils u1x and u2x constitute one parallel coil, segment coils u3x and u4x constitute one parallel coil, and segment coils u5x and u6x constitute one parallel coil. Eight segment coils are held in each of the slots S1, S43, S37, and S31.

Between the slots S1 and S43, weld end portions 3a and 4a of segment coils u3x and u4x are bent in a circumferential direction from the slot S1 to the slot S43, and weld end portions 1b and 2b of segment coils u1x and u2x are bent in a circumferential direction from the slot S43 to the slot S1. The weld end portions 3a and 4a, and the weld end portions 1b and 2b abut against and are welded to each other to form a conductor joint portion 101 including the four weld end portions 3a, 4a, 1b, and 2b. Weld end portions 5a and 6a of segment coils u5x and u6x are bent in the circumferential direction from the slot S1 to the slot S43, and weld end portions 3b and 4b of segment coils u3x and u4x are bent in the circumferential direction from the slot S43 to the slot S1. The weld end portions 5a and 6a, and the weld end portions 3b and 4b abut against and are welded to each other to form a conductor joint portion 102 including the four weld end portions 5a, 6a, 3b, and 4b.

Similarly, between the slots S43 and S37, weld end portions 7b and 8b and weld end portions 9a and 10a that are bent in the circumferential directions are welded to each other to form a conductor joint portion 103, and weld end portions 5b and 6b and weld end portions 7a and 8a that are bent in the circumferential directions are welded to each other to form a conductor joint portion 104. Between the slots S37 and S31, weld end portions 11a and 12a and weld end portions 9b and 10b that are bent in the circumferential directions are welded to each other to form a conductor joint portion 105, and weld end portions 13a and 14a and weld end portions 11b and 12b that are bent in the circumferential directions are welded to each other to form a conductor joint portion 106.

As illustrated in FIG. 13, when the weld end portions 1b, 2b . . . are bent simply in the circumferential directions, that is, when the weld end portions 1b, 2b . . . are not bent in the radial direction, a value obtained by dividing the number of coils held in each of the slots S1 . . . by the number of coils in each parallel coil is limited to an even number. In other words, when all of the conductor joint portions 101 to 106 overlap each other in the circumferential direction of the core inner-peripheral portion 40, the value obtained by dividing the number of coils held in each of the slots S1 . . . by the number of coils in each parallel coil is limited to an even number. That is, a value obtained by dividing the number (eight in the illustrated comparative example) of the segment coils held in each of the slots by the number (two in the illustrated comparative example) of the segment coils that constitute each parallel coil is limited to an even number ("4" in the illustrated comparative example). In this manner, in the stator coil 100 in the comparative example, the value obtained by dividing the number of coils held in each of the slots by the number of coils in each parallel coil is limited to an even number.

Other Embodiments

Figure 14:
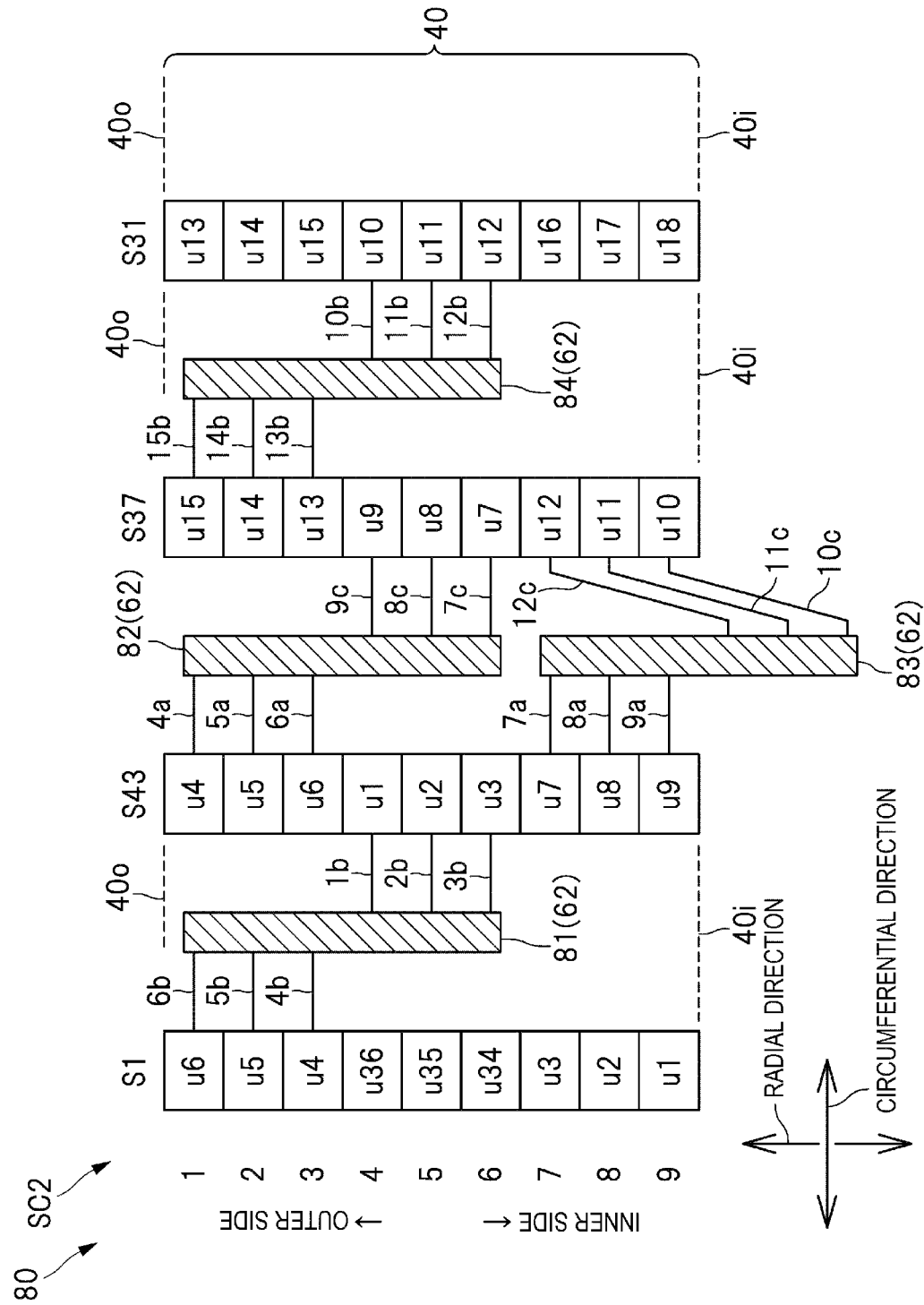
FIG. 14 is a diagram illustrating holding positions of segment coils that constitute a stator coil according to another embodiment.
Figure 15:
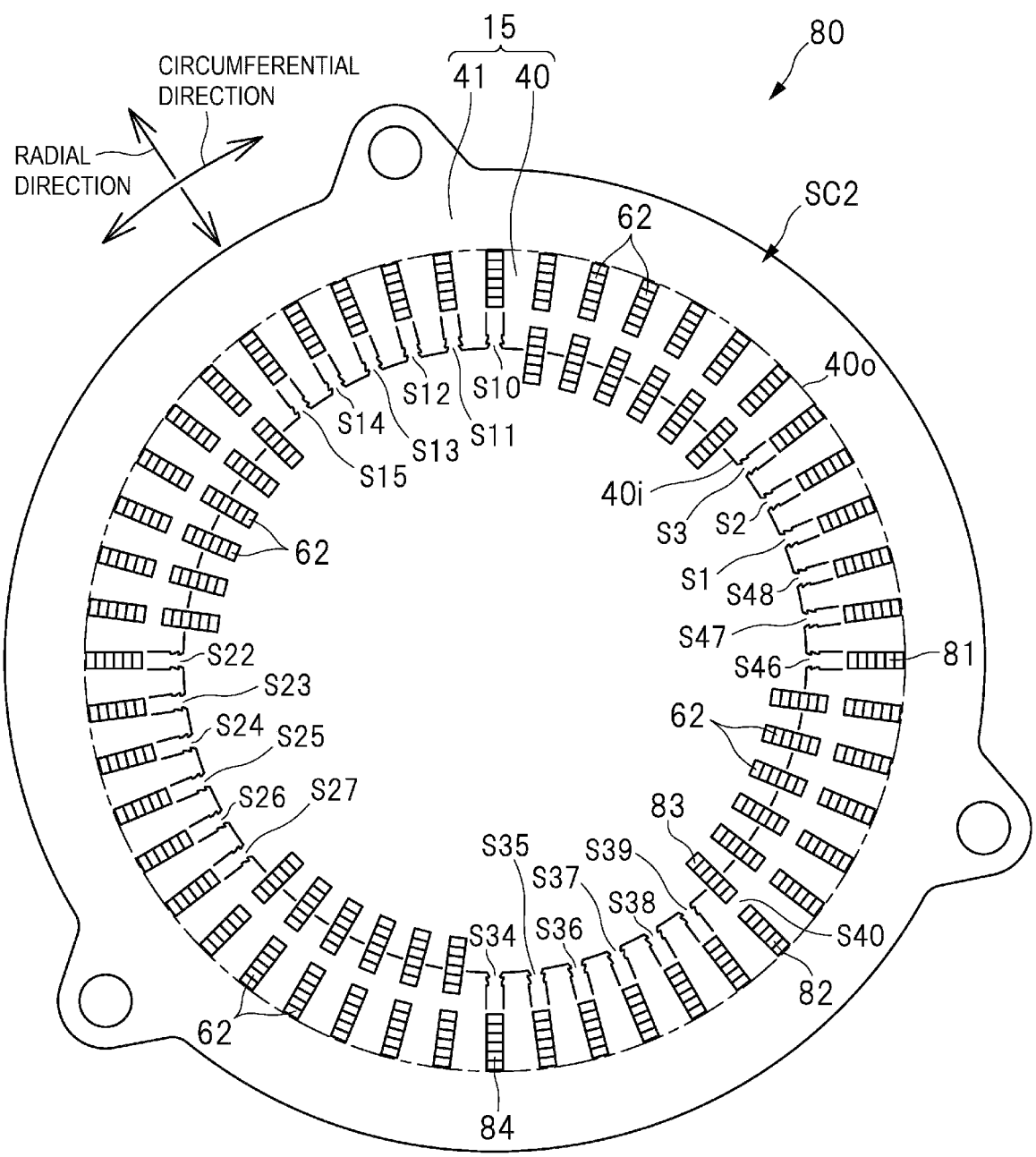
FIG. 15 is a diagram illustrating conductor joint portions of the stator coil as viewed from the power-line side.

In the example illustrated in FIGS. 11 and 12, the conductor joint portion 72 is at least partly located on an outer side of the core inner-peripheral portion 40 in the radial direction. However, this is not to be construed in a limiting sense. The conductor joint portion 72 may be at least partly located on an inner side of the core inner-peripheral portion 40 in the radial direction. FIG. 14 is a diagram illustrating holding positions of the segment coils u1 to u18 and u34 to u36 that constitute a stator coil SC2 according to another embodiment. FIG. 15 is a diagram illustrating the conductor joint portions 62 of the stator coil SC2 as viewed from the power-line side. It is noted that the stator coil SC2 of a stator 80 according to the other embodiment has substantially the same coil configuration as the above-described stator coil SC, that is, the coil configuration illustrated in FIG. 7. It is also noted that substantially the same components and portions as those illustrated in FIGS. 11 and 12 are denoted by identical reference symbols in FIGS. 14 and 15 and will not be repeatedly elaborated.

As illustrated in FIG. 14, between the slots S1 and S43, the weld end portions 4b to 6b of the segment coils u4 to u6 are bent in a circumferential direction from the slot S1 to the slot S43, and the weld end portions 1b to 3b of the segment coils u1 to u3 are bent in a circumferential direction from the slot S43 to the slot S1. The weld end portions 4b to 6b and the weld end portions 1b to 3b abut against and are welded to each other to form a conductor joint portion 81 including the six weld end portions 1b to 6b.

Between the slots S43 and S37, the weld end portions 4a to 6a of the segment coils u4 to u6 are bent in the circumferential direction from the slot S43 to the slot S37, and the weld end portions 7c to 9c of the segment coils u7 to u9 are bent in the circumferential direction from the slot S37 to the slot S43. The weld end portions 4a to 6a and the weld end portions 7c to 9c abut against and are welded to each other to form a conductor joint portion 82 including the six weld end portions 4a to 6a and 7c to 9c.

Moreover, between the slots S43 and S37, the weld end portions 7a to 9a of the segment coils u7 to u9 are bent in the circumferential direction from the slot S43 to the slot S37, and the weld end portions 10c to 12c of the segment coils u10 to u12 are bent both in the circumferential direction and in the radially inward direction from the slot S37 to the slot S43. The weld end portions 7a to 9a and the weld end portions 10c to 12c abut against and are welded to each other to form a conductor joint portion 83 including the six weld end portions 7a to 9a and 10c to 12c.

Between the slots S37 and S31, weld end portions 13b to 15b of the segment coils u13 to u15 are bent in the circumferential direction from the slot S37 to the slot S31, and weld end portions 10b to 12b of the segment coils u10 to u12 are bent in the circumferential direction from the slot S31 to the slot S37. The weld end portions 13b to 15b and the weld end portions 10b to 12b abut against and are welded to each other to form a conductor joint portion 84 including the six weld end portions 10b to 15b.

As illustrated in FIG. 14, the single conductor joint portion 81 is interposed between the slots S1 and S43, the two conductor joint portions 82 and 83 overlapping each other in the radial direction are interposed between the slots S43 and S37, and the single conductor joint portion is interposed between the slots S37 and S31. As illustrated in FIG. 15, the whole stator coil SC2 includes many other conductor joint portions 62. It is noted that the conductor joint portion 81 is disposed in the vicinity of the slot S46, that the conductor joint portions 82 and 83 are disposed in the vicinity of the slot S40, and that the conductor joint portion 84 is disposed in the vicinity of the slot S34.

As illustrated in FIGS. 14 and 15, of the two conductor joint portions 82 and 83 overlapping each other in the radial direction, the conductor joint portion 83 located on an inner side of the stator core 15 in the radial direction is at least partly located on an inner side of the core inner-peripheral portion 40, namely, the imaginary inner-peripheral surface 40i in the radial direction. In one example, the conductor joint portion 83 may serve as an "inner conductor joint portion". In this manner, because at least part of the conductor joint portion 83 is located on an inner side of the core inner-peripheral portion 40 in the radial direction, the conductor joint portion 83 can be disposed apart from the conductor joint portion 82 in the radial direction. With this configuration, even when nine segment coils are held in each slot, each of the parallel coils can be configured with three segment coils.

Take the slot S43 for example. The plural weld end portions protruding from the slot S43 include the plural weld end portions 4a to 9a bent in one of the circumferential directions of the stator core 15, and the plural weld end portions 1b to 3b bent in the other of the circumferential directions of the stator core 15. The number of the weld end portions 1b to 3b is less than the number of the weld end portions 4a to 9a. In one example, the weld end portions 4a to 9a may serve as "first weld end portions", and the weld end portions 1b to 3b may serve as "second weld end portions". Of the plural conductor joint portions 82 and 83 configured with the weld end portions 4a to 9a, the conductor joint portion 83 located on an inner side of the stator core 15 is at least partly located on an inner side of the core inner-peripheral portion 40 in the radial direction.

Take the slot S37 for example. The plural weld end portions protruding from the slot S37 include the plural weld end portions 7c to 12c bent in one of the circumferential directions of the stator core 15, and the plural weld end portions 13b to 15b bent in the other of the circumferential directions of the stator core 15. The number of the weld end portions 13b to 15b is less than the number of the weld end portions 7c to 12c. In one example, the weld end portions 7c to 12c may serve as "first weld end portions", and the weld end portions 13b to 15b may serve as "second weld end portions". Of the plural conductor joint portions 82 and 83 configured with the weld end portions 7c to 12c, the conductor joint portion 83 located on an inner side of the stator core 15 is at least partly located on an inner side of the core inner-peripheral portion 40 in the radial direction.

As illustrated in FIG. 14, the conductor joint portion 83 is configured with the plural weld end portions 7a to 9a and 10c to 12c that protrude from the pair of slots S43 and S37 of the plural slots. The weld end portions 7a to 9a that protrude from one of the pair of slots, namely, the slot S43 are bent in the circumferential direction of the stator core 15, and the weld end portions 10c to 12c that protrude from the other of the pair of slots, namely, the slot S37 are bent both in the circumferential direction and in the radially inward direction of the stator core 15.

As described above, the conductor joint portion 83 is at least partly located on an inner side of the core inner-peripheral portion 40 in the radial direction so that even when nine segment coils are held in each slot, each of the parallel coils can be configured with three segment coils. That is, a value obtained by dividing the number (nine in the illustrated example) of the segment coils held in each of the slots S1 to S48 by the number (three in the illustrated example) of the segment coils that constitute each of the parallel coils P1 to P24 can be set at a value of an odd number ("3" in the illustrated example). In this manner, the value obtained by dividing the number of the coils held in each of the slots by the number of the coils in each of the parallel coils, that is, the number of turns formed by each parallel coil can be set at a value of an odd number so as to widen the scope for a designer of the stator coil SC2.

Needless to say, the disclosure is not limited to the foregoing embodiments, and various modifications can be made thereto within the scope that does not depart from the gist thereof. In the illustrated example, nine segment coils are held in each slot, and each parallel coil includes three segment coils. However, this is not to be construed in a limiting sense. For example, six segment coils may be held in each slot, and each parallel coil may include two segment coils. Alternatively, 12 segment coils may be held in each slot, and each parallel coil may include four segment coils. Alternatively, 15 segment coils may be held in each slot, and each parallel coil may include five segment coils. In such cases, a value obtained by dividing the number of segment coils held in each slot by the number of segment coils that constitute each parallel coil is an odd number For example, 15 segment coils may be held in each slot, and each parallel coil may include three segment coils. In this case, a value obtained by dividing the number of segment coils held in each slot by the number of segment coils that constitute each parallel coil is an odd number "5". Moreover, the number of segment coils held in each slot and the number of segment coils that constitute each parallel coil may be changed so that a value obtained by dividing the number of segment coils held in each slot by the number of segment coils that constitute each parallel coil is set at a value of an odd number "7" or "9", for example.

In the example illustrated in FIG. 11, the conductor joint portion 72 is at least partly located on an outer side of the core inner-peripheral portion 40 in the radial direction. However, this is not to be construed in a limiting sense. The conductor joint portion 72 may be wholly located on an outer side of the core inner-peripheral portion 40 in the radial direction. Both groups of the weld end portions 7a to 9a and the weld end portions 10c to 12c that constitute the conductor joint portion 72 may be bent both in the circumferential direction and in the radially outward direction of the stator core 15.

In the example illustrated in FIG. 14, the conductor joint portion 83 is at least partly located on an inner side of the core inner-peripheral portion 40 in the radial direction. However, this is not to be construed in a limiting sense. The conductor joint portion 83 may be wholly located on an inner side of the core inner-peripheral portion 40 in the radial direction. Both the groups of the weld end portions 7a to 9a and the weld end portions 10c to 12c that constitute the conductor joint portion 83 may be bent both in the circumferential direction and in the radially inward direction of the stator core 15.

The invention claimed is:
1. A stator for a rotary electric machine, the stator comprising:
   a stator core having a hollow cylindrical shape, the stator core comprising a core inner-peripheral portion including slots; and
   a stator winding comprising a phase winding, the phase winding comprising segment conductors held in the slots, wherein
   the phase winding comprises parallel conductors connected to one another in series, each of the parallel conductors comprises ones of the segment conductors connected to one another in parallel, the segment conductors comprise weld end portions that protrude from the slots, that are bent in circumferential directions of the stator core, and that constitute conductor joint portions each of which includes one of the weld end portions welded to another of the weld end portions, weld end portions which protrude from one of the slots among the weld end portions comprise:

first weld end portions bent in one of the circumferential directions of the stator core; and second weld end portions bent in another of the circumferential directions of the stator core, a number of the second weld end portions being less than a number of the first weld end portions, ones of the conductor joint portions are configured with the first weld end portions, the ones of the conductor joint portions comprising an outer conductor joint portion located on an outer side of the stator core in a radial direction of the stator core, the outer conductor joint portion being at least partly located on an outer side of the core inner-peripheral portion in the radial direction, and a value obtained by dividing a number of segment conductors held in one of the slots among the segment conductors by a number of segment conductors that constitute one of the parallel conductors among the segment conductors is an odd number.

2. The stator according to claim 1, wherein the outer conductor joint portion comprises ones of the first weld end portions that protrude from a pair of slots among the slots, and the ones of the first weld end portions comprise:

a third weld end portion that protrudes from one of the pair of slots and is bent in one of the circumferential directions of the stator core; and a fourth weld end portion that protrudes from the other of the pair of slots and is bent both in one of the circumferential directions of the stator core and in a radially outward direction of the stator core.

3. The stator according to claim 2, wherein the number of the segment conductors that constitute one of the parallel conductors is three, and wherein the number of the segment conductors held in one of the slots is nine.

4. The stator according to claim 1, wherein the number of the segment conductors that constitute one of the parallel conductors is three, and wherein the number of the segment conductors held in one of the slots is nine.

5. A stator for a rotary electric machine, the stator comprising:

a stator core having a hollow cylindrical shape, the stator core comprising a core inner-peripheral portion including slots; and a stator winding comprising a phase winding, the phase winding comprising segment conductors held in the slots, wherein the phase winding comprises parallel conductors coupled to one another in series, each of the parallel conductors comprises ones of the segment conductors connected to one another in parallel, the segment conductors comprise weld end portions that protrude from the slots, that are bent in circumferential directions of the stator core and that constitute conductor joint portions each of which includes one of the weld end portions welded to another of the weld end portions, weld end portions which protrude from one of the slots among the weld end portions comprise:

first weld end portions bent in one of the circumferential directions of the stator core; and second weld end portions bent in another of the circumferential directions of the stator core, a number of the second weld end portions being less than a number of the first weld end portions, ones of the conductor joint portions are configured with the first weld end portions, the ones of the conductor joint portions comprising an inner conductor joint portion located on an inner side of the stator core in a radial direction of the stator core, the outer conductor joint portion being at least partly located on an inner side of the core inner-peripheral portion in the radial direction, and a value obtained by dividing a number of segment conductors held in one of the slots among the segment conductors by a number of segment conductors that constitute one of the parallel conductors among the segment conductors is an odd number.

6. The stator according to claim 5, wherein the inner conductor joint portion comprises ones of the first weld end portions that protrude from a pair of slots among the slots, and the ones of first weld end portions comprise:

a third weld end portion that protrudes from one of the pair of slots and is bent in one of the circumferential directions of the stator core; and a fourth weld end portion that protrudes from the other of the pair of slots and is bent both in one of in the circumferential directions of the stator core and in a radially inward direction of the stator core.

7. The stator according to claim 6, wherein the number of the segment conductors that constitute one of the parallel conductors is three, and wherein the number of the segment conductors held in one of the slots is nine.

8. The stator according to claim 5, wherein the number of the segment conductors that constitute one of the parallel conductors is three, and wherein the number of the segment conductors held in one of the slots is nine.

\* \* \* \* \*